United States Patent

Sekhar

(10) Patent No.: US 7,729,326 B2
(45) Date of Patent: *Jun. 1, 2010

(54) WIRELESS NETWORK SYSTEM WITH WIRELESS ACCESS PORTS

(75) Inventor: Ramesh Sekhar, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 317 days.

This patent is subject to a terminal disclaimer.

(21) Appl. No.: 11/142,110

(22) Filed: May 31, 2005

(65) Prior Publication Data

US 2006/0268794 A1    Nov. 30, 2006

(51) Int. Cl.
*H04J 3/22* (2006.01)

(52) U.S. Cl. ............... 370/338; 370/469; 370/464; 714/749; 714/755

(58) Field of Classification Search .................. None
See application file for complete search history.

(56) References Cited

U.S. PATENT DOCUMENTS

| | | | | |
|---|---|---|---|---|
| 5,490,139 | A * | 2/1996 | Baker et al. | 370/312 |
| 6,512,754 | B2 * | 1/2003 | Feder et al. | 370/338 |
| 7,143,407 | B2 * | 11/2006 | Rajaram et al. | 717/173 |
| 7,352,712 | B2 * | 4/2008 | Edwards et al. | 370/310 |
| 7,424,000 | B2 | 9/2008 | Sekhar | |
| 2005/0030946 | A1 * | 2/2005 | Carty et al. | 370/389 |
| 2007/0132846 | A1 * | 6/2007 | Broad et al. | 348/143 |
| 2007/0206519 | A1 * | 9/2007 | Hansen et al. | 370/310 |

FOREIGN PATENT DOCUMENTS

| | | |
|---|---|---|
| EP | 1134935 A2 | 3/2001 |
| EP | 1 134 935 | 9/2001 |
| WO | WO2005/052742 | 6/2005 |
| WO | WO 2005/052742 | 8/2005 |
| WO | WO2005/104796 | 11/2005 |
| WO | WO2006/130587 | 12/2006 |

OTHER PUBLICATIONS

The Toliy Group: "Wireless TCO: The Value of an Overlay Network," A White Paper Commissioned by Symbol Technologies, Jun. 2004, XP002400618, pp. 1-17.
International Search Report for International Application No. PCT/US2006/020884, mailed Oct. 10, 2006.
International Preliminary Report on Patentability dated Dec. 21, 2007 in related case PCT/US06/020884.
European Office Action dated Apr. 1, 2009 in related case EP 06771570.6.
China Office Action dated Apr. 3, 2009 in related case CN 200680019375.6.

* cited by examiner

*Primary Examiner*—Lester Kincaid
*Assistant Examiner*—Mehmood B Khan

(57) ABSTRACT

A communication system comprises a wireless switch, a plurality of wired access ports and a plurality of wireless access ports. The plurality of wired access ports are coupled to the wireless switch via a wired connection and are configured to receive data over the wired connection and over a wireless connection. The plurality of wireless access ports are configured to receive data over the wireless connection from the wireless access port and to send data over the wireless connection to the wired access port. The wireless access ports are further configured to receive and encapsulate first wireless data packets in to first wired data packets based on a wired transmission protocol and encapsulate the first wired data packets into second wireless data packets based on a wireless transmission protocol.

18 Claims, 4 Drawing Sheets

WIRELESS NETWORK SYSTEM WITH WIRELESS ACCESS PORTS

TECHNICAL FIELD OF THE INVENTION

This invention relates to the field of wireless networking and, more specifically, to a wireless network system with wireless access ports.

BACKGROUND OF THE INVENTION

In today's work environment, mobile connectivity is becoming increasingly important. The ability to send and receive data anywhere within an office, school, factory or other location is quickly becoming a necessity, and wireless local area networks have been introduced to facilitate such mobile connectivity. Generally, in a wireless local area network the access points are directly connected to wired networks, such as an ethernet network. In this approach, maintaining configuration data, performing client authentication and performing other tasks are conducted at the access point. However, such an approach has numerous deficiencies and drawbacks, including elevated costs for network management and maintenance.

To alleviate some of these deficiencies and drawbacks, a wireless network has been developed that is based on an intelligent wireless. In this type of wireless network, access ports are coupled with a wireless switch that contains the intelligence to maintain configuration data, perform client authentication and perform other tasks while the access ports provide only wireless access. This configuration has numerous benefits, including ease of management, cost efficiency and flexibility.

Regardless of the wireless network configuration, adequate wireless coverage for a given area is typically confirmed during installation. This confirmation of adequate coverage generally involves a survey of the area that the wireless network is designed to support. However, these surveys can be costly and time consuming. Additionally, the surveys can be inaccurate, leading to areas of poor or no coverage.

Accordingly, it is desirable to provide a wireless network system with wireless access ports that substantially eliminates or totally eliminates the installation survey. Furthermore, the other desirable factors and characteristics of the present invention will become apparent from the subsequent detailed description and the appended claims, taken in conjunction with the accompanying drawings and the for given technical field and background.

BRIEF DESCRIPTION OF THE DRAWINGS

The present invention will hereinafter be described in conjunction with the following drawing figures, wherein like numerals denote like elements, and.

SUMMARY OF THE INVENTION

A communication system is provided in accordance with an exemplary embodiment of the present invention. The communication system comprises a wireless switch, a plurality of wired access ports and a plurality of wireless access ports. The plurality of wired access ports are coupled to the wireless switch via a wired connection and are configured to receive data over the wired connection and over a wireless connection. The plurality of wireless access ports are configured to receive data over the wireless connection from the wireless access port and to send data over the wireless connection to the wired access port. The wireless access ports are further configured to receive and encapsulate first wireless data packets in to first wired data packets based on a wired transmission protocol and encapsulate the first wired data packets into second wireless data packets based on a wireless transmission protocol.

In another exemplary embodiment, an access port for use in a wireless local area network is disclosed. The access port includes an antenna coupled to a wireless receiver and a wireless transmitter. The wireless receiver is configured to receive data packets sent over a wireless link and the wireless transmitter is configured to transmit data packets over the wireless connection. The access port further comprises a processor coupled to the wireless receiver and wireless transmitter, wherein the processor is configured to: (1) encapsulate a first wireless data packet received by the wireless receiver into a first wired data packet using a wired data protocol, and (2) encapsulate the first wireless data packet into a second wireless data protocol for transmission over the wireless link.

In yet another exemplary embodiment, a method for transmitting wireless data packets to a wireless switch is disclosed. In a first step, a first wireless data packet is received. Then, a first wired data packet is formed by encapsulating the first wireless data packet. Next, a second wireless data packet is formed by encapsulating the first wired data packet. The second wireless data packet is used for transmission between a wireless access port and a wired access port.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
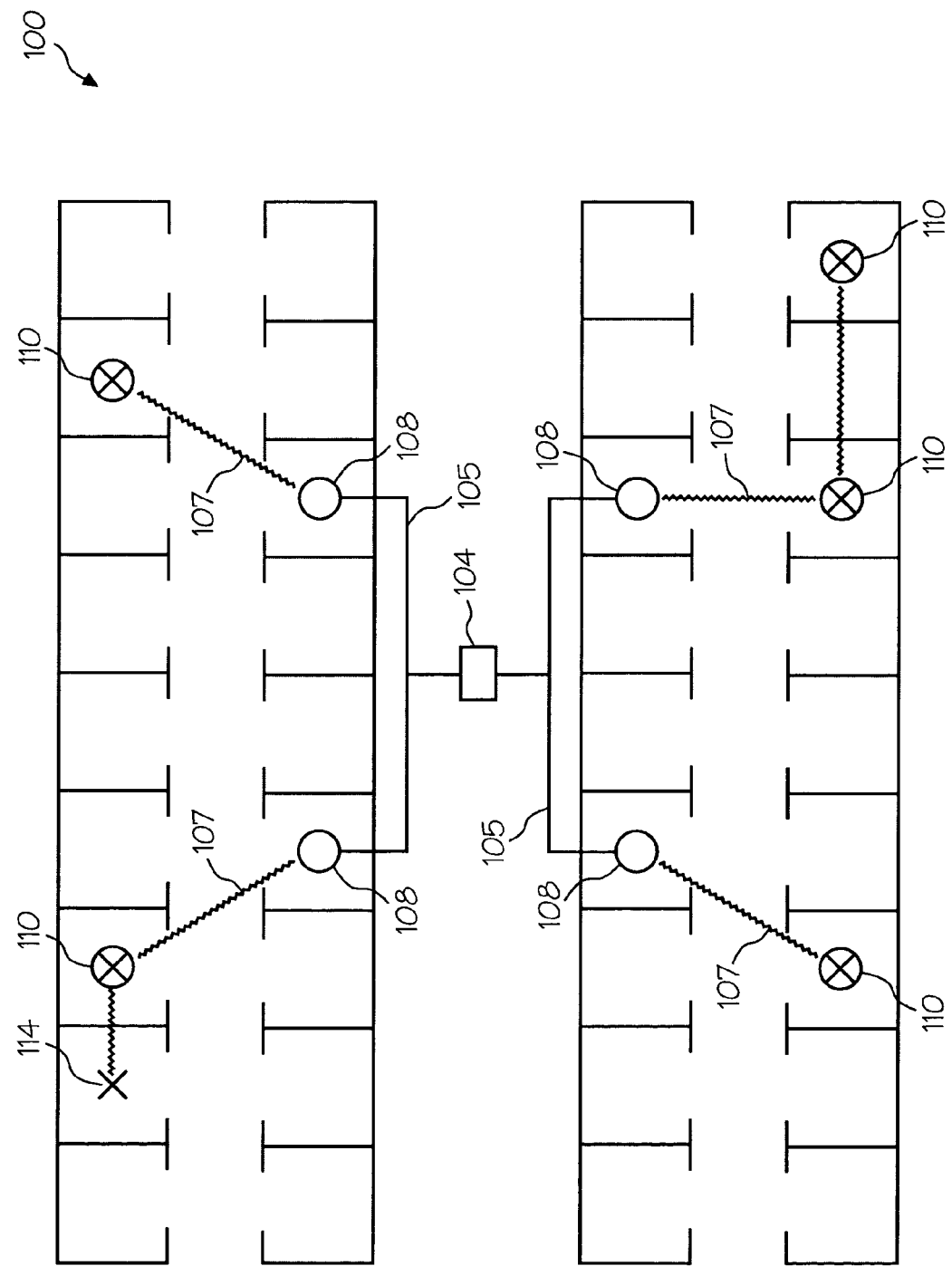
FIG. 1 illustrates a wireless network in accordance with an exemplary embodiment.

FIG. 1 illustrates an exemplary wireless local area network 100 distributed throughout a floor of a building, facility or other location. A wireless switch 104 is provided as part of the wireless local area network 100 and wired access ports 108 are coupled to the wireless switch 104. Also illustrated are wireless access ports 110, which are configured to communicate with the wired access ports 108. The network 100 includes mobile units 114 that can communicate between each other as well as with other devices in the local area network 100 and with devices outside the local area network.

Wireless switch 104 is configured to provide centralized management and intelligence for the wireless local area network 100. For example, wireless switch 104 can determine optimal routes for data to take over the network and provide the routes to wireless access port 110 and wired access port 108. The wireless switch 104 can only receive data directly from the wired access ports 108. The wireless switch 104 can be configured to couple the wireless local area network 100 to another network, such as the Internet.

In addition to providing centralized management and intelligence for the wireless local area network 100, the wireless switch 104 is also configured to distribute software to the wired access ports 108. Additionally, any software updates can be provided to the wireless switch 104. The wireless switch 104 can then distribute the software updates to the wired access ports 108. As will be discussed in greater detail below, the wireless access ports 110 can receive initial software and updated software from one of the wired access ports 108. The software distribution is preferably conducted upon initialization of the wired access port 108. However, other events or combination of events for the wired access ports 108 or other equipment can initiate the software distribution by wireless switch 104.

Wired access ports 108 connect to the wireless switch 104 via a wired connection 105. In one exemplary embodiment, the wired connection 105 can provide data transfer between the wired access ports 108 and the wireless switch 104 using an ethernet protocol. Additionally, the wired connection 105 can also supply power to the wired access ports 108.

Wired access port 108 can receive data packets from the mobile units 114 and send the data packets to the wireless switch 104 and vice versa. In one exemplary embodiment, the mobile units 114 send data packets using the 802.11 protocol. The wired access port 108 can receive the 802.11 data packets, encapsulate the data packets to form new data packets based on a protocol suitable for transfer over a wired connection (e.g. 802.3 data packets or proprietary data packets) and send the data packets to the wireless switch 104 over the ethernet connection.

Wireless access ports 110 are configured to communicate with mobile units 114. Unlike the wired access ports 108, the wireless access ports 110 are not connected to the wireless switch 104 via the wired connection 105. Instead, the wireless access ports 110 are configured to send data to wired access ports 108 via a wireless link 107 and the wired access ports 108 send that data to the wireless switch 104. In one embodiment, wireless access ports 110 can be placed anywhere that is near an accessible power supply, such as a power outlet. Alternatively, wireless access ports 110 can have an on board power systems.

Figure 2:
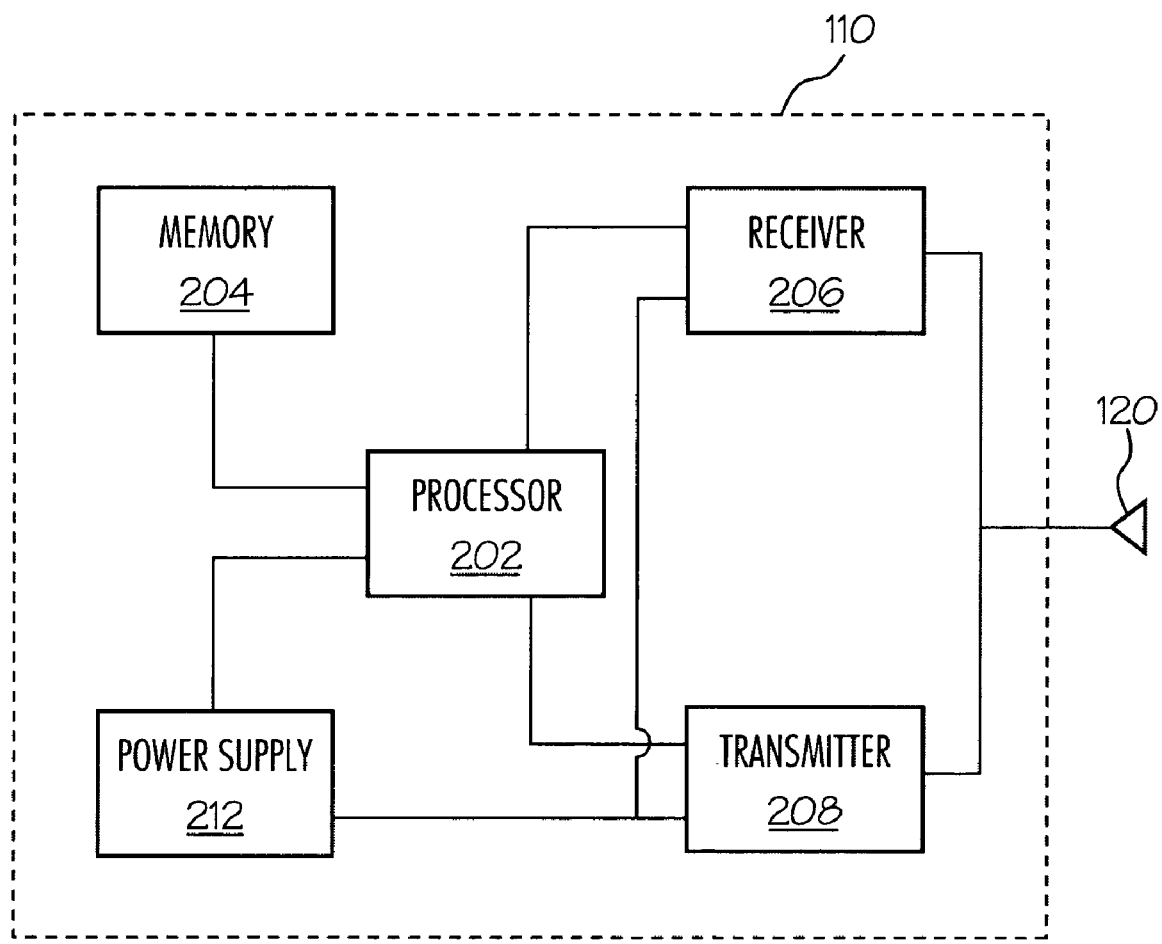
FIG. 2 illustrates a wireless access port in accordance with an exemplary embodiment.

An exemplary wireless access port 110 is illustrated in FIG. 2. Wireless access port 110 comprises a processor 202 coupled to a memory 204. A transmitter 208 and a receiver 206 are coupled to the processor 202 and an antenna 210. Power to the components is supplied via a power supply 212.

Processor 202 is configured to execute the various programs needed for the operation of the wireless access port 110. Processor 202 can store and retrieve data from memory 204 including an initialization boot power program that executes upon initial powering of the wireless access port 110. Also, an image file comprising software code received from the wireless switch 104 from one of the wired access ports 108 can be saved in the memory 204.

Receiver 206 is configured to receive transmissions from other wireless access ports 110, wired access ports 108 and mobile units 114. Transmitter 208 transmits data packets to the mobile units 114, wired access ports 108 and other wireless access ports 110. The wireless access ports 110 are not directly connected to the wireless switch 104. Therefore, the transmitter 208 transmits data to one of the wired access ports 108, which will then send the data to the wireless switch 104. In one exemplary embodiment, receiver 206 and transmitter 208 can be provided as a single unit.

Antenna 210 receives and transmits signals. In one exemplary embodiment, antenna 210 is a single antenna coupled to both the receiver 206 and the transmitter 208. Alternatively, a separate antenna can be provided for the receiver 206 and the transmitter 208 or the transmitting antenna can comprise multiple directional antennas that are arranged to give an overall 360 degrees of coverage if the antennas were used to transmit simultaneously.

Power supply 212 provides power for the wireless access port 110. In a typical embodiment, power supply 212 can connect to a source of AC power, such as an electrical outlet, to power wireless access port 110. Note that unlike the wired access ports 108, the wireless access ports 110 are preferably provided power via an ethernet connection. While power supply 212 is illustrated and discussed as a corded power supply, alternative sources of power, such as batteries, can be utilized in accordance with the teachings of the present invention.

After the wireless access port 110 is installed and provided power, it powers on and listens for beacon transmissions from neighboring access ports, either wired or wireless. The wireless access port 110 selects one or more access ports as neighboring access port based on single strength of the received beacon signal or some other measure of signal quality and then broadcasts a message that will eventually reach the wireless switch. The message can be transferred between any wireless access ports 110 that are in a routing path between the new wireless access port 110 and the wireless switch. Note that the same message can be routed through more than one path in the network if, for example, the message was received by more than one neighboring access ports. When the message reaches the wireless switch 104 via one of the wired access port 108, the wireless switch 104 with a message indicating it received the message from the initiating wireless access port 110. Also, the wireless switch 104 can also initiate the transfer of initialization software to the initiating wireless access port. By observing the route that the message from the initiating wireless access port 110 took through the network, the wireless switch can determine optimal routing paths and send the routing information to the access ports in the local area network 100.

Figure 3:
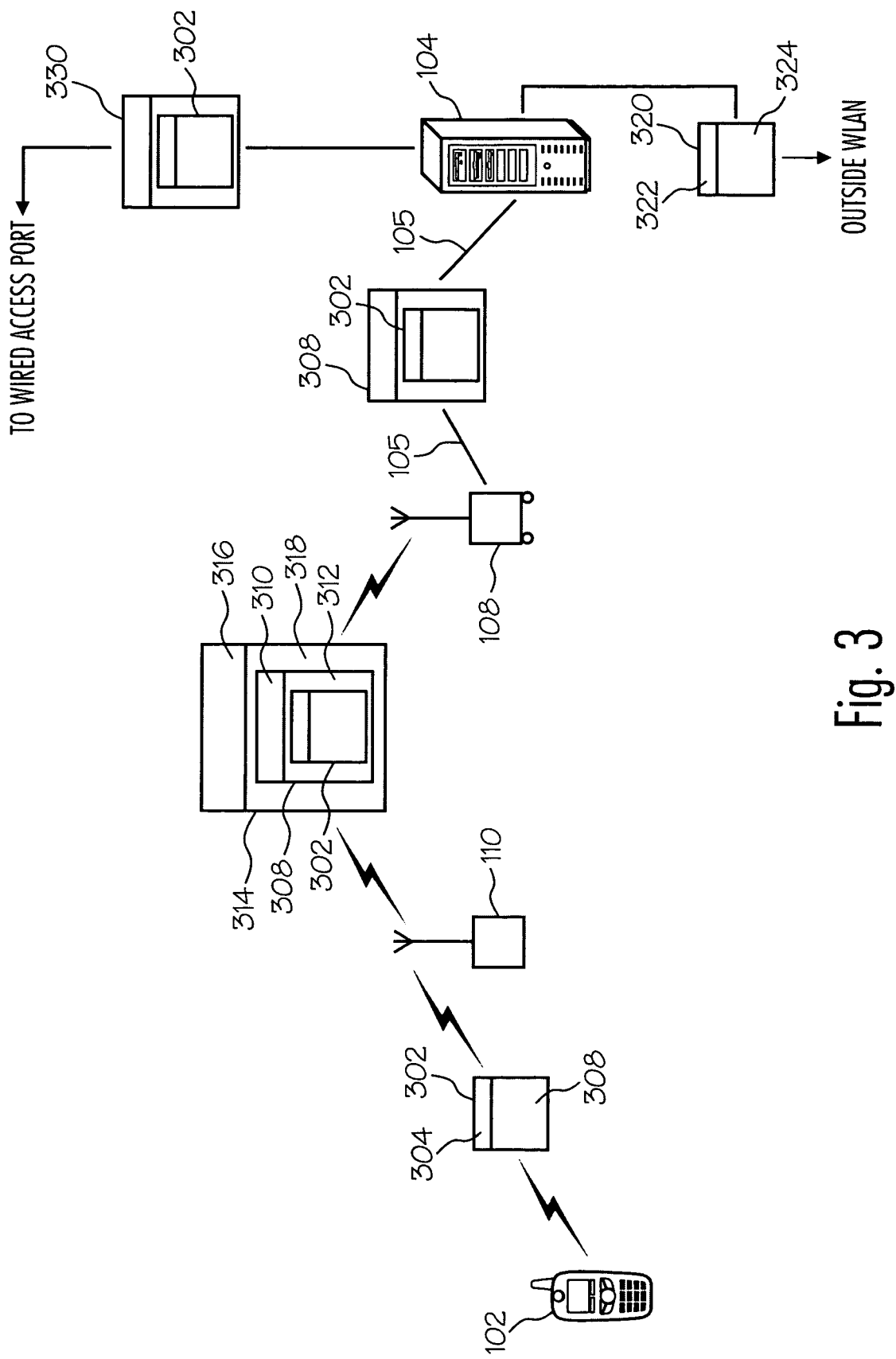
FIGS. 3-4B illustrates a data packet transfer in accordance with an exemplary embodiment.
Figure 4A:
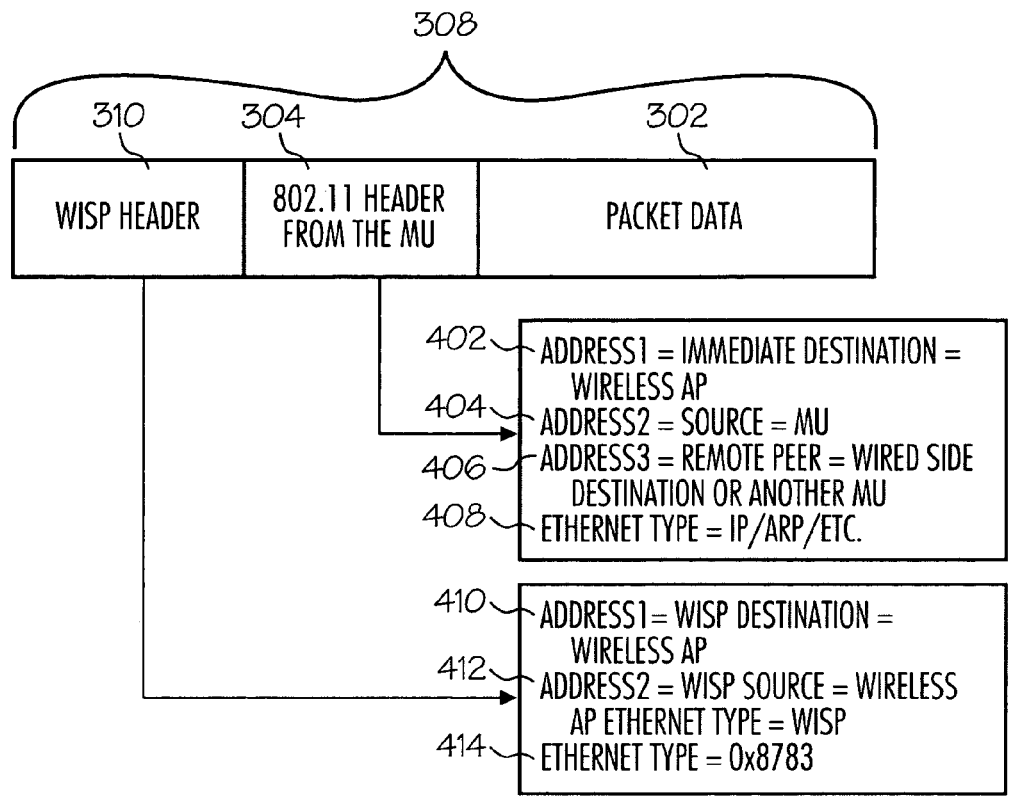
Figure 4B:
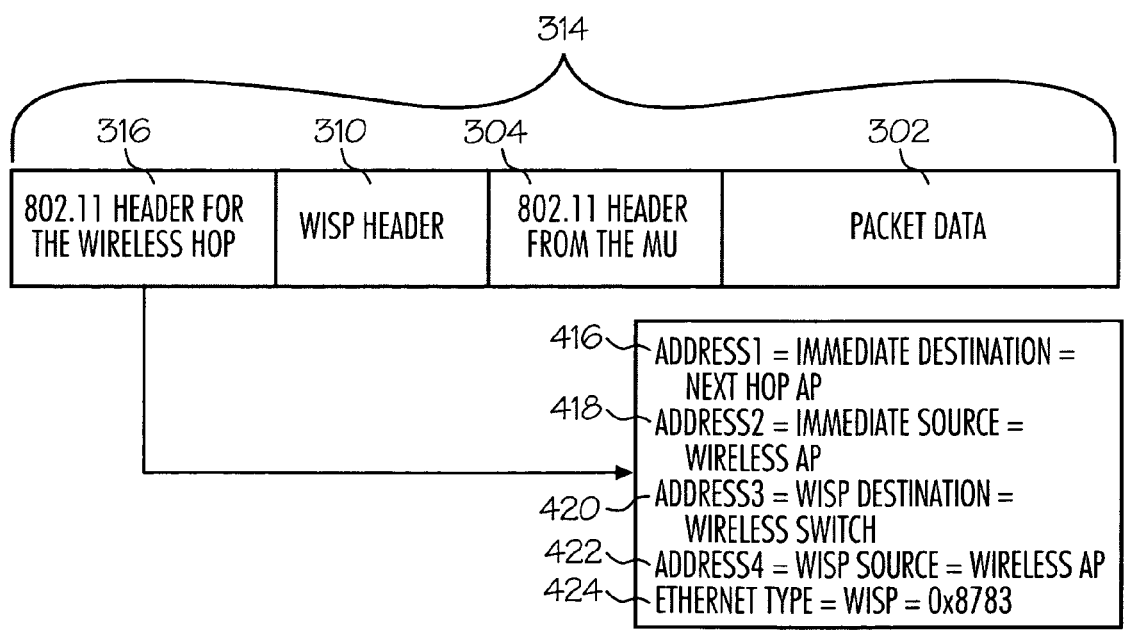

An exemplary embodiment of sending data packets within the local area network 100 is illustrated in conjunction with FIGS. 3-4b. The mobile unit 114 sends first data packets 302, comprising a first header 304 and a first data payload 306, over the wireless link 107. The first data packets 302 conform to a wireless data protocol, such as an 802.11 protocol or other proprietary or non-proprietary wireless protocol.

The first data packets 302 can be received by one of the wireless access ports 110. The wireless access port 110 encapsulates the first data packet 302 to form second data packets 308 that conform to a proprietary or non-proprietary wired protocol. In this exemplary embodiment, the Ethernet type is a proprietary Ethernet protocol such as the Wireless Switch Protocol (WISP), sold by Symbol Technologies of Holtsville, N.Y. Data packet 308 comprises a second header 310 and a second payload 312. Turning to FIG. 4a, the second payload 312 includes the first header 304 and the first payload 306. Note that the first header 304 is a wireless header field that includes a first address field 402 that lists the immediate destination of the first data packet 302, which, in this example, was the wireless access port 110. A second address field 404 lists the source of the packet, which, in this example, was the mobile unit 114. A third address field 406 lists the remote peer, which, in this example, is the ultimate destination of the first data packet 406 such as another mobile user on the network or someone outside the network. Before reaching the ultimate destination, the data must go through the wireless switch 104. An Ethernet type field 408 lists the Ethernet message format type, which can be a non-proprietary protocol such as Address Resolution Protocol (ARP) or a proprietary protocol. The fields listed are only some of the fields that can be present in the first header 304.

The second header 310, in one embodiment of the present invention corresponds to a proprietary Ethernet message format type, which, in this exemplary embodiment, can be WISP, as discussed above. Thus, second header 310 can be referred to as a WISP header. The second header 310 comprises multiple fields including a first address field 410, which is the second packet 308 destination, also known as the WISP destination. In this example, the WISP destination is the wireless switch 104. A second address field 412 is the current source field 412, which is source of the second packet 308. This is also known as the WISP source and, in this example, is the wireless access port 110. A third field is an Ethernet type field 414 that indicates the Ethernet message format. In this exemplary embodiment, the Ethernet type is the WISP ethernet type and a value indicating that message type can be found in the Ethernet type field. The fields listed are only some of the fields that can be present in the second header 310.

Since the second data packets 308 are in a wired data protocol and wireless access port 110 can only send data wirelessly, the second data packets 308 are further encapsulated into third data packets 314 that conform to a wireless data protocol, such as an 802.11 protocol or other proprietary or non-proprietary protocol. The third data packets 314 include a third header 316 and a third payload 318. Turning to FIG. 4b, FIG. 4b illustrates third data packets 314 having a third header 316 and a third payload 318. The third payload 318 includes the second data packets 308 information. Third header 316 is the wireless data header containing data needed for the wireless hop between the wireless access port 110 and the wired access port 108. In includes a source field 315, which comprises the identity of the wireless access port 110 and a destination field 317, which comprises the identity of the destination wired comprising several data fields. These data fields include a first address field 416, which is the immediate destination for third packet 314. In this example, the immediate destination is the wired access port 108. A second address field 418 is the immediate source of third data packet 314. In this example, the immediate source is the wireless access port 110. A third address field 420 is the Ethernet, or in this example, the WISP destination of the second data packet 308 and a fourth address field 422 is the ethernet, or in this example, the WISP source of the second data packet 308. An Ethernet message type field 424 indicates the Ethernet message protocol used for second data packet 308, which as discussed before, is WISP in this exemplary embodiment. The fields listed are only some of the fields that can be present in the third header 316.

Third data packet 314 can be received by wired access port 108. The wired access port 108, as discussed previously, is coupled to the wireless switch 104 by wired connection 105. Thus, the wired access port 108 will send data packets conforming to a wired data protocol. To accommodate this requirement, wired access port 108 removes the second data packet 308 from the third data packet 314. As discussed previously, the second data packet 308 can be sent over the wired connection 105 to the wired switch 104.

When the second data packet 308 is received by the wireless switch 104, the wireless switch 104 determines the destination of the first packet, which can be found in the first address field 402 of the first header 304. If the destination is outside the local area network 100, the wireless switch 104 removes the data from the first payload 306 of the first data packet 302 and repackages the data into a fourth payload 322 of a fourth data packet 320 that includes, as a destination the original destination of the first data packets 302 and the source of the first data packet 302 in a fourth header 324. Typically, the fourth data packet 320 conforms to a wired data protocol.

If the data is destined for a location within the local are network 100, the wireless switch 104 can extract the first data packet 302 from the second data packet 308 and encapsulate the first data packet 302 into a fifth data packet 330. The fifth data packet 330 will resemble the second data packet 308 as illustrated in FIG. 2 but will have different source and destination fields.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed:

1. A communication system comprising:
   a wireless switch;
   a plurality of wired access ports coupled to the wireless switch via a wired connection and configured to receive data over the wired connection and over a first wireless connection; and
   a plurality of wireless access ports each configured to receive data over a second wireless connection from a mobile user and to send data over the first wireless connection to the one of the plurality of wired access ports, the wireless access port further configured to
      receive and to encapsulate first wireless data packets received from the mobile user into first wired data packets based on a wired transmission protocol including adding a header into the first wired data packets with a destination address field indicating an address of the wireless switch and
      then to further encapsulate the first wired data packets into second wireless data packets based on a wireless transmission protocol including adding a header into the second wireless data packets with a destination address field indicating an address of the wired access port; and
   wherein the wired access ports are each configured to receive the second wireless data packets from one of the plurality of wireless access ports and to extract the first wired data packets from the second wireless data packets received for subsequent transmission over the wired connection to the wireless switch.

2. The system of claim 1 wherein the wireless transmission protocol is an 802.11 protocol and the wired transmission protocol is an ethernet protocol.

3. The system of claim 1 wherein the wireless switch is configured to receive the first wired data packets from the wired access port, to extract the first wireless data packets from the first wired data packets, and to place a payload of the first wireless data packets into second wired packets for transmission outside the communication system.

4. The system of claim 3 wherein the wireless switch is further configured to remove the first wired data packets and encapsulate the first wired data packets into third wired data packets for transmission within the communication system, via the wireless access ports.

5. The method of claim 1 wherein a mobile unit operating in the communication system is configured to send data to the wireless access ports.

6. The system of claim 1 wherein the plurality of wired access ports download operational software upon boot-up from the wireless switch.

7. The system of claim 6 wherein the plurality of wireless access ports download the operational software from the wired access ports.

8. The system of claim 7 wherein a new wireless access port downloads operational software from one of the plurality of wireless access ports.

9. The system of claim 1 wherein the wired connection utilizes an ethernet protocol.

10. The system of claim 1 wherein a software update can be delivered to each of the plurality of wired access ports and each of the plurality of wireless access ports via the wireless switch.

11. The system of claim 1 wherein each of the plurality of wireless access ports can be added to the communication system without performing a survey of the site where the communication system is located.

12. The system of claim 1 wherein the wireless switch is a gateway to an external computer network.

13. An access port for use in a wireless local area network comprising:
   an antenna coupled to the wireless receiver;
   a wireless receiver coupled to the antenna and configured to receive data packets sent over a wireless link;
   a wireless transmitter coupled to the antenna and configured to transmit data packets over the wireless link; and
   a processor coupled to the wireless receiver and wireless transmitter, the processor configured to:
      first encapsulate a first wireless data packet received by the wireless receiver into a first wired data packet using a wired data protocol including adding a header into the first wired data packet with a destination address field indicating an address of a wireless switch,
      further encapsulate the first wired data packet into a second wireless data protocol including adding a header into the second wireless data packet with a destination address field indicating an address of a wired access port, and
      transmit the second wireless data packet to the wired access port via a wireless connection, wherein the wired access port is connected to the wireless switch via a wired connection (105).

14. The access port of claim 13 wherein the processor is further configured to:
   utilize the wireless receiver to recognize a second access port that is already part of the network;
   send an initialization message to the second access port; and
   receive a software image to load into memory and execute using the processor.

15. The access port of claim 13 wherein the wireless protocol is an 802.11 protocol.

16. The access port of claim 13 wherein the antenna comprises a receiver antenna coupled to the wireless receiver and a transmit antenna coupled to the wireless transmitter.

17. A method for transmitting wireless data packets from a wireless access port to a wireless switch comprising:
   receiving a first wireless data packet by the wireless access port;
   forming a first wired data packet by encapsulating the first wireless data packet into a wired data protocol frame;
   adding a header into the first wired data packet with a destination address field indicating an address of the wireless switch;
   forming a second wireless data packet by encapsulating the first wired data packet into a wireless frame,
   adding a header into the second wireless data packet with a destination address field indicating an address of a wired access port; and
   transmitting the second wireless data packet from the wireless access port to a wired access port via a wireless connection, wherein the wired access port is connected to the wireless switch via a wired connection.

18. The method of claim 17 further comprising receiving the second wireless data packet at the wired access port, stripping the first wired data packet from the second wireless data packet and sending the first wired data packet from the wired access port to the wireless switch.

* * * * *